United States Patent
Labat et al.

[11] Patent Number: 5,233,631
[45] Date of Patent: Aug. 3, 1993

[54] DEVICE FOR RECOVERING A CARRIER WAVE PROVIDED WITH A CIRCUIT FOR INHIBITING DUMMY FREQUENCY ACQUISITIONS

[75] Inventors: Joél Labat, Plougastel Daoulas; Dominique Leroux, Le Trehou; Patrick Vandamme, Perros Guirec, all of France

[73] Assignee: France Telecom, Issy Les Moulineaux, France

[21] Appl. No.: 711,191

[22] Filed: Jun. 6, 1991

[30] Foreign Application Priority Data

Jun. 6, 1990 [FR] France ................. 90 07010

[51] Int. Cl.$^5$ ............................. H03D 3/18
[52] U.S. Cl. .......................... 375/81; 375/83; 329/304
[58] Field of Search ........... 375/77, 81, 83, 93; 329/304, 306, 307, 308; 455/208, 209

[56] References Cited

U.S. PATENT DOCUMENTS 4,704,582  11/1987  Dixon et al. ............... 375/81
5,025,455   6/1991  Nguyen .................... 329/30 X
5,115,454   5/1992  Kucar ..................... 375/81

FOREIGN PATENT DOCUMENTS 72241    2/1983  European Pat. Off. .
2552959  4/1985  France .

Primary Examiner—Stephen Chin
Attorney, Agent, or Firm—Cesari and McKenna

[57] ABSTRACT

The invention concerns a device for recovering a carrier wave provided with a circuit for inhibiting dummy frequency hookings or acquisitions for phase-modulated digital signals in N states with a phase N=2P, device including a phase locking loop provided with demodulation, a voltage-controllable oscillator, a 90° phase shifter, for the low-pass filtering of basic band signals X1(t) and Y1(t), a loop filter, for sampling the signals X1(t) and Y1(t) and having a sampling frequency Fe so that Fe>(2p+1|n|)/T where T is the reciprocal value of the modulation speed and, associated with this loop, a circuit for drawing up the filtered signals Sign Sin (2P Φk) and Sign Cos (2P Φk) required for detection of the direction of variation of the phase error, a phase/frequency comparator, loss of synchronization and hooking detection and an adaptive filter.

4 Claims, 3 Drawing Sheets

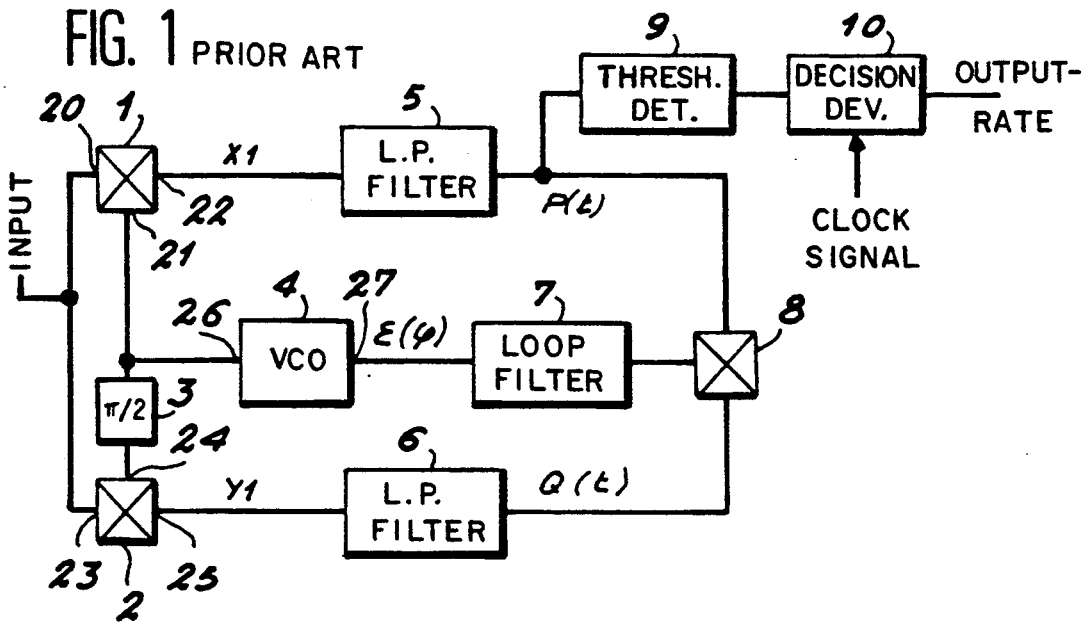
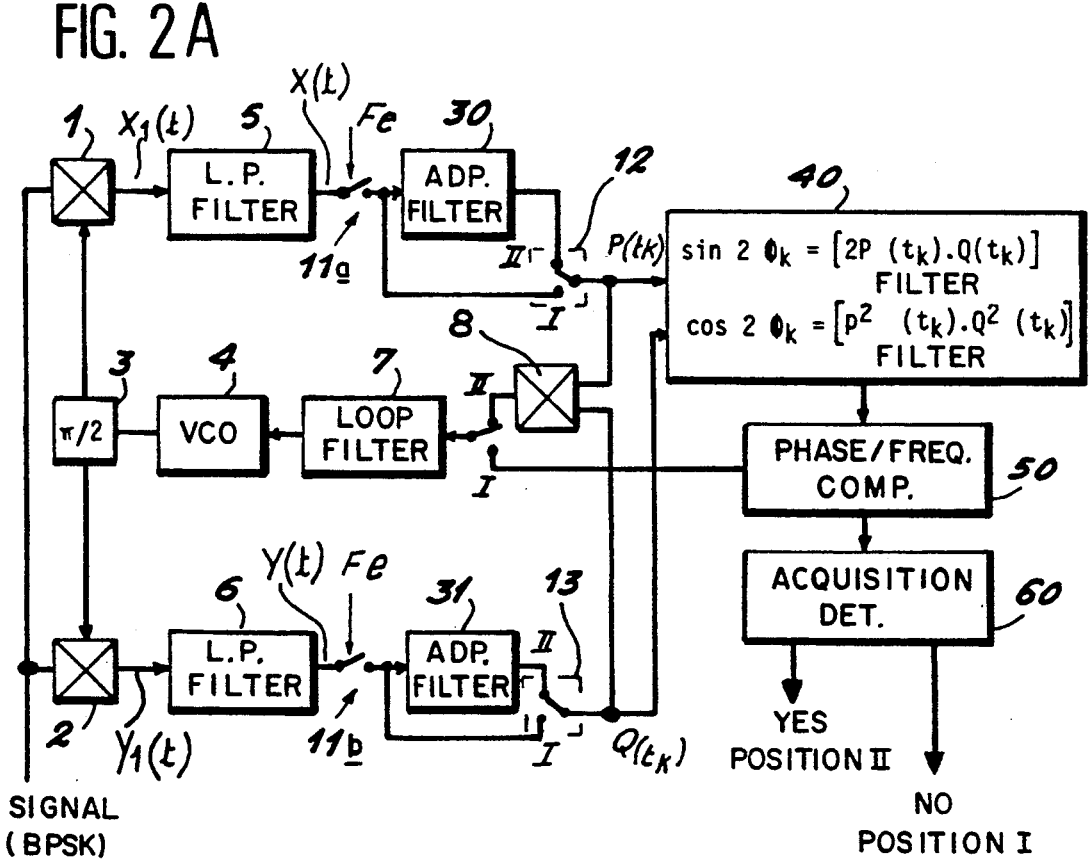

DEVICE FOR RECOVERING A CARRIER WAVE PROVIDED WITH A CIRCUIT FOR INHIBITING DUMMY FREQUENCY ACQUISITIONS

FIELD OF THE INVENTION

The invention concerns a device for recovering a carrier wave provided with means for inhibiting dummy frequency hookings for phase-modulated digital signals.

BACKGROUND OF THE INVENTION

This invention can be used in digital transmission applications and, more particularly, in the case where, after having transmitted an electromagnetic wave by modulation, information is restored or retrieved by coherent demodulation.

The range of application of the invention is thus extremely wide and covers data transmission modems, hertzien beams, space communications systems, indeed optics (in the case of heterodyne links).

The demodulation of a wave assumes that the receiver receiving the transmission knows the frequency and phase of the transmission carrier wave.

To this end, a demodulation wave is generated by a voltage-controllable oscillator (OCT), the control voltage of this oscillator being supplied by a phase comparator delivering an error voltage according to the phase deviation $\Phi$ between the modulated carrier wave and the wave generated by the oscillator.

Having regard to the fact that the transmission carrier wave may be amplitude and/or phase modulated, the structure of the phase comparator depends on the modulation used.

The recovery of the carrier wave by the phase locking loop firstly requires that the oscillator has a frequency close to the received modulated wave. As this is effected by phase comparison between the received modulated wave and the wave delivered by the oscillator, the frequency from the wave of the oscillator is modified continuously until it reaches the frequency of the modulated wave.

This frequency hooking or acquisition phase is not guaranteed in those devices traditionally used to recover the carrier wave of a digitally modulated signal.

In fact, dummy frequency acquisitions do occur and particularly when the difference between the bearer frequency and the frequency of the local receiving oscillator is a whole multiple of half the modulation speed.

This phenomenon is normal when the digital transmission speeds are slow and when the drift of the oscillators, associated with a possible Doppler effect (in the case of satellite transmissions), requires a large acquisition range. For example, this applies to the transmission system of the IMMARSAT STANDARD C type.

A device for the coherent demodulation of signals modulated in two phase states, commonly known as a "Costas Loop", is shown on FIG. 1.

This device does not make it possible to resolve the problems of dummy frequency acquisitions in cases of two-state phase modulation. However, it is possible to elementarily detect a dummy frequency acquisition and relaunch acquisition by specially forcing the control signal of the oscillator, as indicated in the description given hereafter.

The device includes an voltage-controllable oscillator 4 receiving on one control input 27 an error signal $\epsilon(\Phi)$ and having one output 26 delivering a wave whose phase depends on the error signal.

The device also includes two demodulators 1 and 2. The first one has two inputs 20 and 21 receiving respectively the modulated wave and the wave delivered by the voltage-controlled oscillator, and has one output 22 delivering a signal X1. The second one has two inputs 23 and 24 respectively receiving the modulated wave and the wave delivered by the voltage-controllable oscillator, firstly dephased by 90° by a static phase shifter 3, and one output 22 delivering a signal Y1.

A lowpass filter 5 is disposed at the output of the demodulator 1. This filter delivers a filtered signal P(t). Similarly, a lowpass filter 6 is disposed at the output of the demodulator 2, this filter delivering a filtered signal Q(t). These filters are required to suppress the harmonics at the output of the demodulator. They may also be used to maximize the signal/noise ratio if this has not been done with the aid of the bandpass filter placed upstream of the two demodulators.

The device of FIG. 1 also includes a loop filter 7 which delivers at its output the error signal $\epsilon(\Phi)$, this filter receiving at its input the output signal of a multiplier 8.

The filtered signals P(t) and Q(t) are applied to the two inputs of a multiplier 8.

The unit thus forms a phase locking loop.

The device also includes a threshold detector 9 followed by a decision device 10 controlled by a clock (not shown).

This unit makes it possible to known the level of the output signal of the lowpass filter and thus to know whether or not the phase locking is correct. In fact, when a locking is correct, one of the two signals is virtually nil, whereas in the presence of a dummy acquisition, the signals of the quadrature and phase signals have identical dynamics.

Unfortunately, this simple system has the drawback of being unable to be extended to modulations in a larger number of states and in particular gives no indication on frequency shift, that is concerning the direction in which the local voltage control oscillator needs to be orientated so as to reduce this frequency shift.

However, this problem may be resolved by adding at the input of the local oscillator a periodic low frequency signal, known as a scanning signal, which is inhibited as soon as the above-mentioned criterion is verified.

Unfortunately, this solution may require a complete period of the scanning signal which is, as mentioned above, a low frequency signal, which means that the acquisition time may remain long.

However, the Applicant has noticed that this time could be substantially reduced provided it is possible to estimate the direction in which the voltage-controlled oscillator needs to be orientated.

A second method consists of observing that in the presence of a dummy acquisition, the loop noise is greater when the system is correctly locked. But then the decision criterion is less reliable, as a large loop noise may simply be linked to poor propagation conditions and thus a large loop noise rate does not necessarily indicate a dummy frequency acquisition. This method is accordingly very much open to criticism.

Furthermore, the French patent application filed on Oct. 4, 1983 and registered under the number 2552959 concerns a device for recovering a carrier wave with the aid of a Costas demodulator to which a phase and frequency comparator is added for signals modulated in N phase states.

The principle of this device consists of carrying out a general processing on the signals P(t) and Q(t) of the quadrature and phase channels of the Costas demodulator so as to firstly draw up the error voltage of the servo system, and secondly a proportional voltage after filtering at the frequency shift. This technique makes it possible to considerably reduce acquisition time more effectively than with conventional systems using a blind scanning signal.

However, this device does not in itself resolve the problem of dummy frequency acquisitions particularly critical in IMMARSAT STANDARD C type low speed digital transmission systems, for example. In fact, in this type of transmission, dummy frequency acquisitions may occur when the difference between the bearer frequency and the frequency of the local oscillator is a whole multiple of half the modulation speed R ($R=1/T$).

SUMMARY OF THE INVENTION

The device of the invention for recovering a carrier wave is able to overcome these drawbacks.

More specifically, the object of the invention is to provide a device for recovering a carrier wave provided with a device for inhibiting dummy frequency acquisitions for phase-modulated digital signals in N phase states, $N=2P$ being a positive integer, mainly characterized in that it includes:

a) a phase locking loop comprising:
   means for demodulating the modulated input signal delivering two basic quadrature band signals $X_1(t)$ and $Y_1(t)$,
   a voltage-controllable oscillator,
   a 90° dephaser or phase shifter,
   means for the lowpass filtering of the signals $X_1(t)$ and $Y_1(t)$ delivering the signals $X(t)$ and $Y(t)$,
   a Costas type phase comparison device or multiplier where $P=1$,
   a loop filter,
   means for sampling the signals $X(t)$ and $Y(t)$ at a sampling frequency Fe needed to verify the relation $Fe > (2p+1|n|)/T$, in which
      T is the reciprocal value of the modulation speed,
      2p is the number of phase modulation states,
      n is a relative whole number so that $|n|/(2T)$ represents half the frequency band centered on the frequency of the carrier wave in which the frequency acquisitions are to be inhibited;
b) and associated with this loop:
   means for detecting and correcting the direction of variation of the phase error,
   a phase/frequency comparator,
   loss of synchronization and acquisition detection means;
c) suitable filtering means inserted in the phase locking loop after the sampling means when the acquisition detection means have detected an acquisition.

A second characteristic of the recovery means of the phase error variation direction detection means comprise:
   an arithmetical and logic unit receiving the sampled basic band signals and delivering a first signal $\sin(2p\Phi_k)$ and a second signal $\cos(2p\Phi_k)$, both representative of the phase error $\Phi_k$ between the carrier wave and the wave provided by the oscillator at the sampling time $t_k$,
   a digital transversal filter for each of the preceding trigonometric signals delivering a signal representative of the sign of the first and second signals after lowpass filtering.

According to another characteristic of the invention, the phase/frequency comparator includes a type D sweep circuit receiving on its input D the sign signal of the first signal representing the phase error and a clock signal on its clock input provided by a logic gate which receives at its inputs the second signal representing the phase error, the sampling signal and a signal ST representing a change of state of the sign signal of the first filtered phase error signal $\sin(2p\Phi_k)$.

According to a further characteristic of the invention, the loss of synchronization and acquisition detection means comprise:
   a counter whose input receives the signal ST indicating a change of the state of the sign signal of the first filtered phase error signal validated by the sign signal of the second filtered phase error signal,
   a threshold comparator receiving an output signal of the counter and delivering an acquisition detection signal when the validated change of state number obtained by the counter is greater than the threshold,
   a first logic gate receiving on its inputs a signal ST representing a change of state of the sign signal of the first phase error signal and the sign signal of the second filtered phase error signal,
   a second logic gate receiving on its inputs the signal ST and the sign signal of the second previously inverted filtered phase error signal and delivering a signal including one transition from one low state to the upper state a state representing a loss of synchronization detection, this signal being applied to one input for restoring the counter to its initial conditions.

BRIEF DESCRIPTION OF THE DRAWINGS

Other characteristics and advantages of the invention shall appear more readily from a reading of the following description, given by way of non-restrictive illustration, with reference to the accompanying drawings on which:

FIG. 1, already described, shows a device for recovering a carrier wave according to the prior art for the case $p=1$, FIG. 2a shows a device for recovering a carrier wave according to the invention, also $p=1$.

DETAILED DESCRIPTION OF THE PREFERRED EMBODIMENTS

Figure 2B:
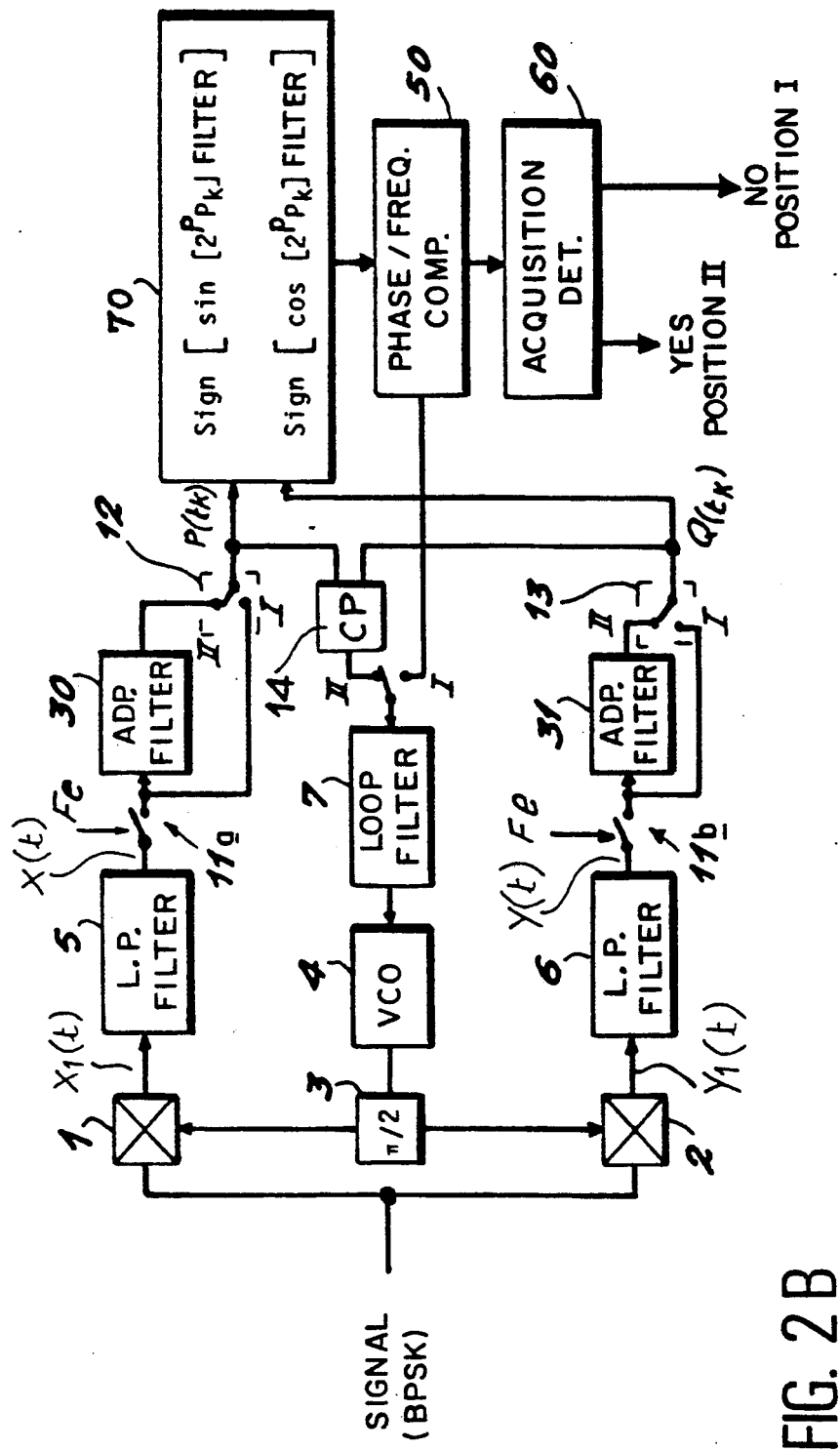
FIG. 2B shows the same device adapted to any p case.

FIG. 2A corresponds to the diagram of a device for recovering a carrier wave conforming to the invention. In this diagram, certain elements have the same function as the elements shown on FIG. 1 of the prior Art and accordingly bear the same reference as these latter elements.

The device for recovering a carrier wave conforming to the invention thus comprises two demodulators 1 and 2, each receiving the phase-modulated digital input signal (BPSK). These two demodulators are connected to a 90° dephaser or phase shifter 3 so as to deliver the basic phase and quadrature band signals. One first signal X1(t) is delivered by the demodulator 1 and a second signal Y1(t) is delivered by the demodulator 2. The signal X1(t) is filtered by a lowpass filter 5 delivering the signal X(t), the signal Y1(t) being filtered by a lowpass filter 6 delivering the signal Y(t). The device also comprises means able to sample the filtered basic band signals, this sampling being effected at a frequency Fe with a period Te so that $Fe > (2p+1|n|)/T$ in which T is the reciprocal value of the modulation speed and n a relative whole number. The sampling means are constituted by the sampler 10 with a frequency Fe placed at the output of the lowpass filter 5 and by the sampler 11 with a frequency Fe placed at the output of the lowpass filter 6.

The device also comprises a loop filter 7 whose input signal is the output of the multiplier 8, followed by a voltage-controllable oscillator (VCO) 4 delivering the sinusoidal wave applied to the demodulator 1 and the demodulator 2 after a phase shift of 90°.

The device of the invention comprises means for drawing up or producing the two signals required to evaluate the variation direction of the phase error 40. These means receive the sampled signals P(tk) and Q(tk), which are either the sampled signals X(t) and Y(t) or a filtered version of these signals, and initially make it possible to obtain signals representing the phase error $Sin(2 \Phi k)$ and $Cos(2 \Phi k)$, and secondly, after filtering of these two signals, their polarity, that is the filtered sign of $Sin(2 \Phi k)$ and the filtered sign of $Cos(2 \Phi k)$. These signals are accordingly designated as follows:

Sign (Sin(2 k) filtered

Sign (Cos(2 k) filtered

The device of the invention also comprises a phase-/frequency comparator 50 which receives the filtered Sign signal $Sin(2 \Phi k)$ and the filtered Sign signal $Cos(2 \Phi k)$, this comparator making it possible to detect the variation direction of the phase error and delivering an adequate error signal.

The device also comprises acquisition detection means 60 able, on the basis of the information derived from the phase/frequency comparator, to deliver a first signal corresponding to acquisition detection and then tilt the switches 12 and 13 onto the position II, a second signal corresponding to a detection of loss of synchronization resulting in a tilting of the switches onto the position I.

As soon as the system is correctly locked, a suitable filtering is accordingly carried out on the phase and quadrature channels.

FIG. 2B, valid generally where p is any, only differs from FIG. 2A with respect to two devices. The device 70 still comprises means for drawing up the two signals required to evaluate the variation direction of the phase error. This time, however, these two signals are the filtered Sign signals $Sin(2p \Phi k)$ and $Sign Cos(2p \Phi k)$. Their role in relation to the other devices is identical to those of the filtered Sign signals $Sin(2 \Phi k)$ and $Sign Cos(2 \Phi k)$ of the device 40 of FIG. 2A.

The device 14 is a Costas type phase comparator replacing the multiplier 8 of FIG. 2A. It uses the two input signals P(tk) and Q(tk) and delivers an output signal as a function of p. For example, for p=2, the circuit 14 delivers the signal $P(tk).Q(tk).P2(tk) - Q2(tk)$.

The functioning of the device of the invention is now to be detailed on the basis of an embodiment, given by way of example, of the devices 40, 50 and 60.

Figure 3:
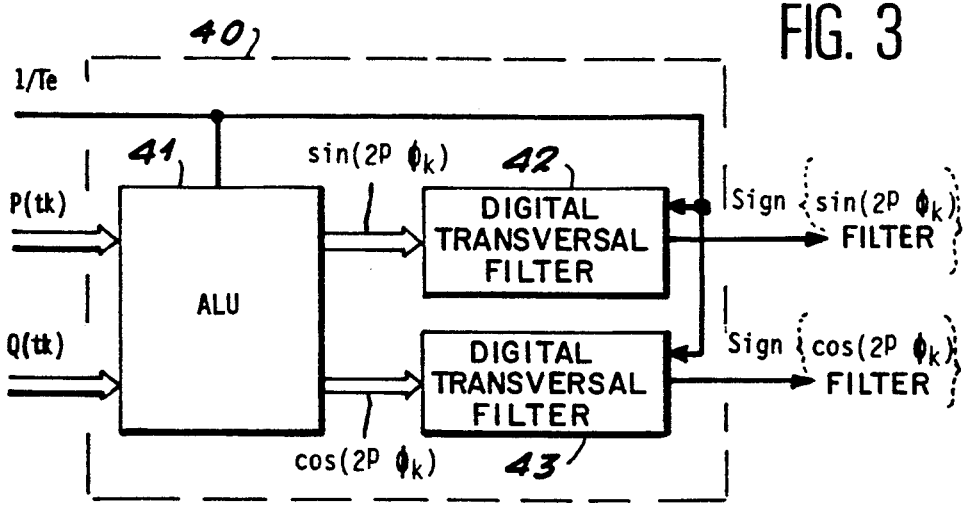
FIG. 3 shows the means for drawing up the "sign" signals of the first and second filtered phase error signals.

Thus, FIG. 3 corresponds to a particular embodiment of the device 70, this device able to deliver two signals required to detect the direction of variation of the phase error.

The device 70 firstly comprises an arithmetic and logic unit 41 followed by a first digital transversal filter 42 which receives the signal $Sin(2p \Phi k)$ and a second digital transversal filter 43 which receives the signal $Cos(2p \Phi k)$. The arithmetic and logic unit 41 receives the data corresponding to the sampled signal Q(tk). This arithmetic and logic unit in fact makes it possible to deliver the Sinus and Cosinus signals of $2p \Phi k$. This unit 41 receives the binary words corresponding to the signals P(tk) and Q(tk) at the rate of 1/Te. The unit 41 is conventional in itself and makes it possible to obtain at the rate 1/Te the discrete signals $Sin(2p \Phi k)$ and $Cos(2p \Phi k)$ by following, with the aid of trigonometrical decomposition rules, their expression as a function of $Sin(\Phi k)$ and $Cos(\Phi k)$ where these latter quantities are respectively replaced by Q(tk) and P(tk). These signals are then filtered before any polarity information is extracted. Filtering is effected for each signal with the aid of the transversal digital filters 42 and 43, functioning at this same rate 1/Te and whose coefficient values make it possible to obtain a lowpass characteristic of its transfer function. In practice, one transversal coefficient filter 17 proves to be sufficient.

Only the polarity of the outputs of the filters is used by the frequency/phase comparator. The filter 42 thus delivers the filtered Sign signal $Sin(2p \Phi k)$ and the filter 43 delivers the filtered Sign signal $Cos(2p \Phi k)$.

Figure 4:
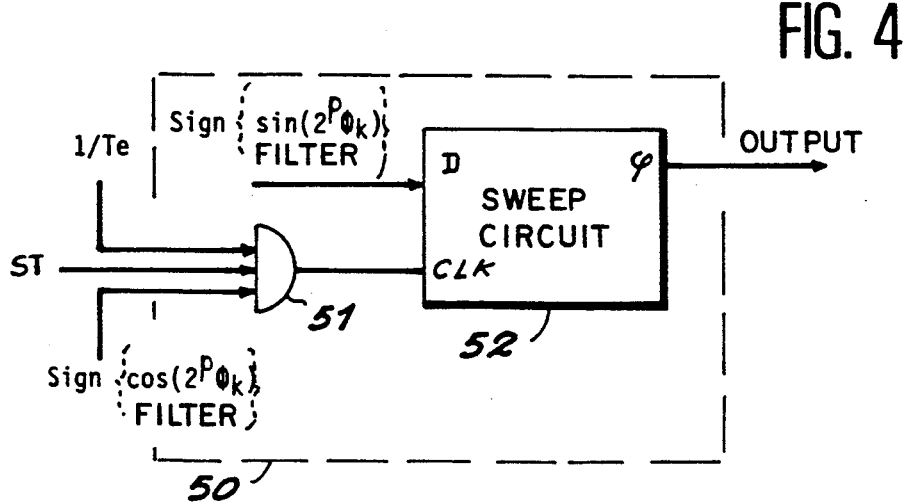
FIG. 4 shows the phase/frequency comparator of the invention.

FIG. 4 shows one embodiment example of the phase/frequency comparator.

The frequency/phase comparator follows the principle set forth in the patent application filed on Oct. 4, 1983 under the number 83 15794 and published under the number 2552959. However, considering the difference of the general structure described in this patent application, for the particular case of a phase modulation in N states, it is possible to simplify its implantation by replacing the signals Fx and Fy by the once filtered signal with the polarity of $Cos(N \Phi k)$. Thus, the filtered Sign signal $Sin(2p \Phi k)$ corresponds to the signal E of the aforesaid patent application, the filtered Sign signal $Cos(2p \Phi k)$ replaces the signals Fx and Fy of the aforesaid patent application, the signal St is obtained from the filtered Sign signal $Sin(2p \Phi k)$ in the same way as this signal ST is obtained from the signal S in the aforesaid patent application.

Thus, the frequency/phase comparator has a simplified structure shown on this FIG. 4. It comprises a logic gate ET 51 with three inputs and receiving on one of its inputs the frequency signal 1/Te, the signal ST on the second input and the filtered Sign signal $Cos(2p \Phi k)$ on the third input. The output of this gate 51 makes it possible to activate the clock input of a type D sweep circuit bearing the reference 52. This sweep circuit receives on its input D the filtered Sign signal Sin(2p Φk). The output Q of the sweep circuit indicates the sign of the phase error and may thus be used to provide the voltage-controllable oscillator.

Figure 5:
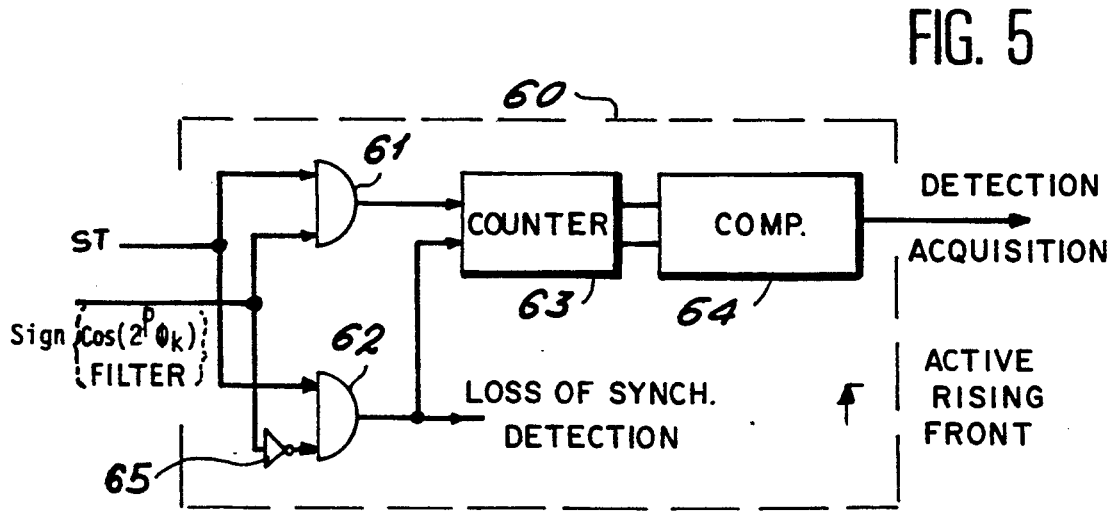
FIG. 5 shows the loss of synchronization and acquisition detection means.

FIG. 5 shows one embodiment example of the loss of synchronization and acquisition detection device 60 on FIGS. 2A and 2B.

This device comprises a counter able to count a given number of the consecutive changes of signs of the filtered signal Sin(2p Φk), the filtered signal Cos(2p Φk) remaining positive. In order to do this, the counter receives on its input the signal ST which is only validated when the filtered Sign signal Cos(2p Φk) is positive. The counter is followed by a threshold comparator 64. So as to guarantee the consecutive nature of the sign transitions, any detection of a transition when the filtered Sign signal Cos(2p Φk) is negative reinitializes the counter 63. This is effected by the output of a logic gate ET bearing the reference 62 which receives on one of its inputs the signal ST and on the other input the filtered Sign signal Cos(2p Φk) and inverted in an inverter 65.

The threshold of the comparator has been fixed at eight in the particular application described.

The comparator 64 makes it possible to deliver the acquisition detection signal and control tilting of the switches 12 and 13 onto the position II. The output of the logic gate 62 makes it possible to deliver a loss of synchronization detection signal. In fact, the loss of synchronization is detected when a transition of the state of the filtered Sign signal Sin(2p Φk) is observed, the filtered Sign signal Cos(2p Φk) being negative.

The output of this gate 62 makes it possible to control tilting of the switches 12 and 13 onto the position I.

The choice of a sampling frequency, having for a period $Te < T/(2p+1|n|)$ in the case of a modulation in N phase states, N=2p, 1/T denoting the modulation speed, makes it possible to obtain an excess sampling of the signals P(t) and Q(t) enabling the device described to detect the presence of a frequency shift and to annul it, which resolves at one go the problems of dummy frequency acquisitions.

Furthermore, the device described makes it possible to detect the correct locking of automatic control by taking account of a certain number M of consecutive changes of signs of Sin(2p Φt) (respectively Sin(2p Φk)) which have occurred, whereas Cos(2p Φt) (respectively Cos(2p Φk) remains positive so as to decide that the system is correctly locked.

As from this moment, suitable filtering is effected on the phase and quadrature channels and the conventional Costas loop is used.

In fact, the phase/frequency comparator previously described generates a phase noise, possibly significant, especially when the flows are weak, which is precisely the case here. This is simply linked to the fact that the comparator continuously supplies the adequate correction signal which, in a first approximation, is virtually periodic. This signal may then generate a considerable phase noise according to the time constant of the loop filter, whereas on the other hand, if the flows are high, this phase noise quickly becomes negligible.

Furthermore, the device described makes it possible to detect any possible ill-timed unhooking and then relaunch the acquisition phase with the aid of the switches 12 and 13 placed in the position I at any time when the system is not correctly locked.

What is claimed is:

1. A device for recovering a carrier wave provided with a circuit for inhibiting dummy frequency acquisitions for an input signal phase-modulated in N-Phase states with N=2p, p being a positive integer, wherein said device includes
    a phase locking loop comprising
        demodulating means for demodulating said input signal and delivering two signals X1(t) and Y1(t),
        a voltage-controlled oscillator providing an output signal,
        a 90° phase shifter receiving said oscillator output signal and providing a phase-shifted signal to control said demodulating means,
        filter means for the low pass filtering of said signals from said demodulating means,
        a loop filter connected to the input of said oscillator,
        a Costas-type phase comparator, or a multiplier in the case where p=1, connectable to the input of said loop filter, and
        sampling means connected to receive the output from said filter means for sampling the filtered signals at a sampling frequency Fe with a period Te so that $Fe > (2p+1/n/)/T$, where T is the reciprocal value of the modulation speed and n is a relative whole number, said sampling means producing sampled signals;
    and associated with said phase locking loop
        signal producing means for drawing up the signals required to evaluate the direction of variation of any phase error between carrier wave and output signal from said oscillator,
        a phase/frequency comparator connected to receive the output of said signal producing means;
    loss of synchronization and acquisition detection means connected to receive the output of said phase/frequency comparator and to produce a control signal in response thereto;
    filtering means connected to receive the sampled signals from the sampling means and producing filtered signals in response thereto, and
    selection means connected to receive said sampled signals and said filtered signals and being responsive to said control signal to deliver output signal to said phase comparator or multiplier and to said signal producing means which consist of said sampled signals when said synchronization and acquisition detection means have not detected an acquisition and said filtered signals when said synchronization and acquisition detection means have detected an acquisition.

2. The device for recovering a carrier wave according to claim 1, wherein said producing means comprise
    an arithmetic and logic unit receiving said output signals from said selection means and delivering a first Sin (2p φk) signal and a second Cos (2p φk) signal, both signals being representative of the phase error φk between the carrier wave and the wave at the output of said voltage-controlled oscillator, and
    a digital transversal filter connected to receive each of said first and second signals representing the phase error and delivering to said phase/frequency comparator signals representing the signs of the first and second signals after filtering.

3. The device for recovering a carrier wave according to claim 2, wherein the phase frequency comparator includes
- a type D sweep circuit having a signal input and a clock input and being connected to receive on its signal input the sign signal of said first signal representing the phase error, and
- a logic gate for receiving the sign signal of the second signal representing the phase error, a sampling signal ST and one signal representing a change of state of the sign signal of the first filtered phase error signal, and providing an output signal to the clock input of said sweep circuit.

4. The device for recovering a carrier wave according to claim 2, wherein the loss of synchronization and acquisition detection means comprise
- a counter for receiving said signal indicating a change of state of the sign signal of said first filtered phase error signal validated by the sign signal of the second filtered phase error signal;
- a threshold comparator connected to receive the output of said counter and to deliver an acquisition detection signal to said selection means when the number of validated changes of states counted by the counter is greater than a selected threshold;
- a first logic gate receiving at one input a signal representing a change of state of the sign signal of the first filtered phase error signal and on a second input, the sign signal of the second filtered phase error signal, and
- a second logic gate connected to receive on one input the sampling signal ST and on a second input the second filtered phase error signal previously inverted, said second logic gate producing an output signal with a state representing a loss of synchronization detection, said output signal being applied as a reset signal to said counter.

* * * * *